(12) United States Patent
Kammer et al.

(10) Patent No.: US 7,755,210 B2
(45) Date of Patent: Jul. 13, 2010

(54) SYSTEM AND METHOD FOR CONTROLLING WIND TURBINE ACTUATION

(75) Inventors: Leonardo Cesar Kammer, Niskayuna, NY (US); Waseem Ibrahim Faidi, Schenectady, NY (US); Shu Ching Quek, Clifton Park, NY (US); Peggy Lynn Baehmann, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/631,003

(22) Filed: Dec. 4, 2009

(65) Prior Publication Data

US 2010/0140940 A1    Jun. 10, 2010

(51) Int. Cl.
*F03D 9/00* (2006.01)
(52) U.S. Cl. .................. 290/44; 290/55; 416/1
(58) Field of Classification Search .................. 290/43, 290/44, 54, 55; 416/1, 41
See application file for complete search history.

(56) References Cited

U.S. PATENT DOCUMENTS

| | | | | |
|---|---|---|---|---|
| 4,426,192 A * | 1/1984 | Chertok et al. ............... | 416/1 |
| 5,109,700 A * | 5/1992 | Hicho ........................ | 73/660 |
| 5,155,375 A * | 10/1992 | Holley ....................... | 290/44 |
| 6,567,709 B1 * | 5/2003 | Malm et al. .................. | 700/21 |
| 6,789,024 B1 * | 9/2004 | Kochan et al. ................ | 702/45 |
| 6,891,280 B2 * | 5/2005 | Siegfriedsen ................. | 290/44 |
| 7,317,260 B2 * | 1/2008 | Wilson ....................... | 290/44 |
| 7,417,332 B2 * | 8/2008 | Malakhova et al. ........... | 290/44 |
| 7,423,352 B2 | 9/2008 | Suryanarayanan et al. | |
| 7,476,985 B2 | 1/2009 | Gonzalez | |
| 7,692,322 B2 * | 4/2010 | Wakasa et al. ................ | 290/44 |
| 2006/0033338 A1 | 2/2006 | Wilson | |
| 2006/0140761 A1 | 6/2006 | LeMieux | |

OTHER PUBLICATIONS

Michele Rossetti (Ecotècnia s.c.c.l., R&D, Spain); Ervin Bossanyi, United Kingdom (Garrad Hassan and Partners LTD.), "Reducing Tower Base Fatigue Loads With Active Pitch Control-Results Form Simulations and Field Tests".

Andrew R. Henderson; Minoo H. Patel, "Floating Offshore Wind Energy", Department of Mechanical Engineering, University College London, Torrington Street, London, WCIE 7JE. 0171-380-7220. e-mail: a_henderson@meng.ucl.ac.uk, thhp://www.owen.eru.rl.ac.uk/clocuments/bwea20_48.pdf.

* cited by examiner

*Primary Examiner*—Nicholas Ponomarenko
(74) *Attorney, Agent, or Firm*—Francis T. Coppa

(57) ABSTRACT

A wind turbine includes a plurality of wind turbine blades attached to a rotor positioned atop a tower affixed to a tower foundation. At least one blade pitch sensor is configured to measure blade pitch angles for one or more of the wind turbine blades. A rotor/generator speed sensor is configured to measure the rotational speed of the wind turbine rotor, a corresponding wind turbine generator, or both. A wind turbine nacelle yaw sensor is configured to measure the nacelle yaw, while at least two tower-base bending sensors are configured without use of adhesives, cements or bonding agents to provide large-area measurement of tower deflection. A controller is configured to adjust the pitch angle of one or more of the wind turbine blades in response to the measured one or more blade pitch angles, the measured rotational speed, the measured nacelle yaw and measured tower longitudinal deflection.

20 Claims, 4 Drawing Sheets

SYSTEM AND METHOD FOR CONTROLLING WIND TURBINE ACTUATION

BACKGROUND

This invention relates generally to wind turbines, and more particularly to methods and apparatus for controlling wind turbine actuation to compensate for variations in wind speed.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility scale grade wind turbines (i.e., wind turbines designed to provide electrical power to a utility grid) can have large rotors (e.g., 70 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid in some known embodiments.

The most significant source of variations in the operation of a wind turbine is the variation in the wind speed that acts on the rotor. An efficient utilization of controlled actuation to compensate for such variations in wind speed depends on prompt measurement or estimation of such variations. Lags and delays on the estimation of the effective wind speed lead to reduced efficacy in energy capture and tower fatigue reduction.

Some known techniques for estimating wind speed are based on measurements of rotor speed, blade pitch angle and generator torque/electrical power. Other known techniques for estimating wind speed use tower position information that offers improvements in response time over generator torque measurements techniques. Yet other known techniques employ measurement systems such as Lidar to obtain the effective average wind speed ahead of the turbine. Still another known technique uses strain measurements of piezoresistive cement-based materials in a 4-pole electrode arrangement. While the foregoing solutions are very effective, the cost of those measurement systems is still much too high and economically disadvantageous. Further, the use of adhesives, cements and/or bonding agents is generally highly sensitive to the electrode-tower contact and is therefore not optimal for large numbers of measurement points over a large area of a wind tower.

In view of the foregoing, it would be advantageous to provide methods and apparatus for controlling wind turbine actuation faster, more reliably, and in a more cost effective manner than that which is achievable using known techniques that compensate for variations in wind speed.

BRIEF DESCRIPTION

According to one embodiment, a wind turbine comprises:
a plurality of wind turbine blades attached to a rotor positioned atop a tower affixed to a tower foundation;
at least one blade pitch sensor configured to measure blade pitch angles for one or more wind turbine blades;
a rotor/generator speed sensor configured to measure the rotational speed of the wind turbine rotor, a corresponding wind turbine generator, or both;
a nacelle yaw sensor configured to measure nacelle yaw;
at least two tower-base bending sensor elements configured without use of adhesives, cements or bonding agents, to measure over a large area, tower deflection in real-time; and
a controller configured to adjust the pitch angle of one or more wind turbine blades in response to the measured one or more blade pitch angles, the measured rotational speed, the measured nacelle yaw, and measured large area tower longitudinal deflection.

According to another embodiment, a wind turbine control system comprises:
at least one sensor configured to measure blade pitch angles for one or more wind turbine blades;
a rotor/generator speed sensor configured to measure the rotational speed of a wind turbine rotor, a wind turbine generator, or both;
a nacelle yaw sensor configured to measure a wind turbine nacelle yaw;
at least two sensor elements configured without use of adhesives, cements or bonding agents, to measure over a large area, tower deflection in real-time; and
a controller configured to adjust the pitch angle of one or more wind turbine blades in response to the measured one or more blade pitch angles, the measured rotational speed, the measured nacelle yaw, and measured tower longitudinal deflection.

According to yet another embodiment, a method of actuating a wind turbine positioned atop a tower affixed to a tower foundation comprises:
providing at least one blade pitch sensor configured to measure blade pitch angles for one or more wind turbine blades;
providing a rotor/generator speed sensor configured to measure the rotational speed of a wind turbine rotor, a wind turbine generator, or both;
providing a wind turbine nacelle yaw sensor configured to measure nacelle yaw;
providing at least two tower-base bending sensor elements configured without use of adhesives, cements or bonding agents, to measure over a large area, tower deflection in real-time;
measuring blade pitch angles for one or more wind turbine blades;
measuring the rotational speed of a wind turbine rotor, a wind turbine generator, or both;
measuring nacelle yaw;
measuring tower deflection in real-time for a large surface area of the tower; and
adjusting the pitch angle of one or more wind turbine blades in response to the measured one or more blade pitch angles, the measured rotation speed, the measured nacelle yaw, and measured tower longitudinal deflection.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
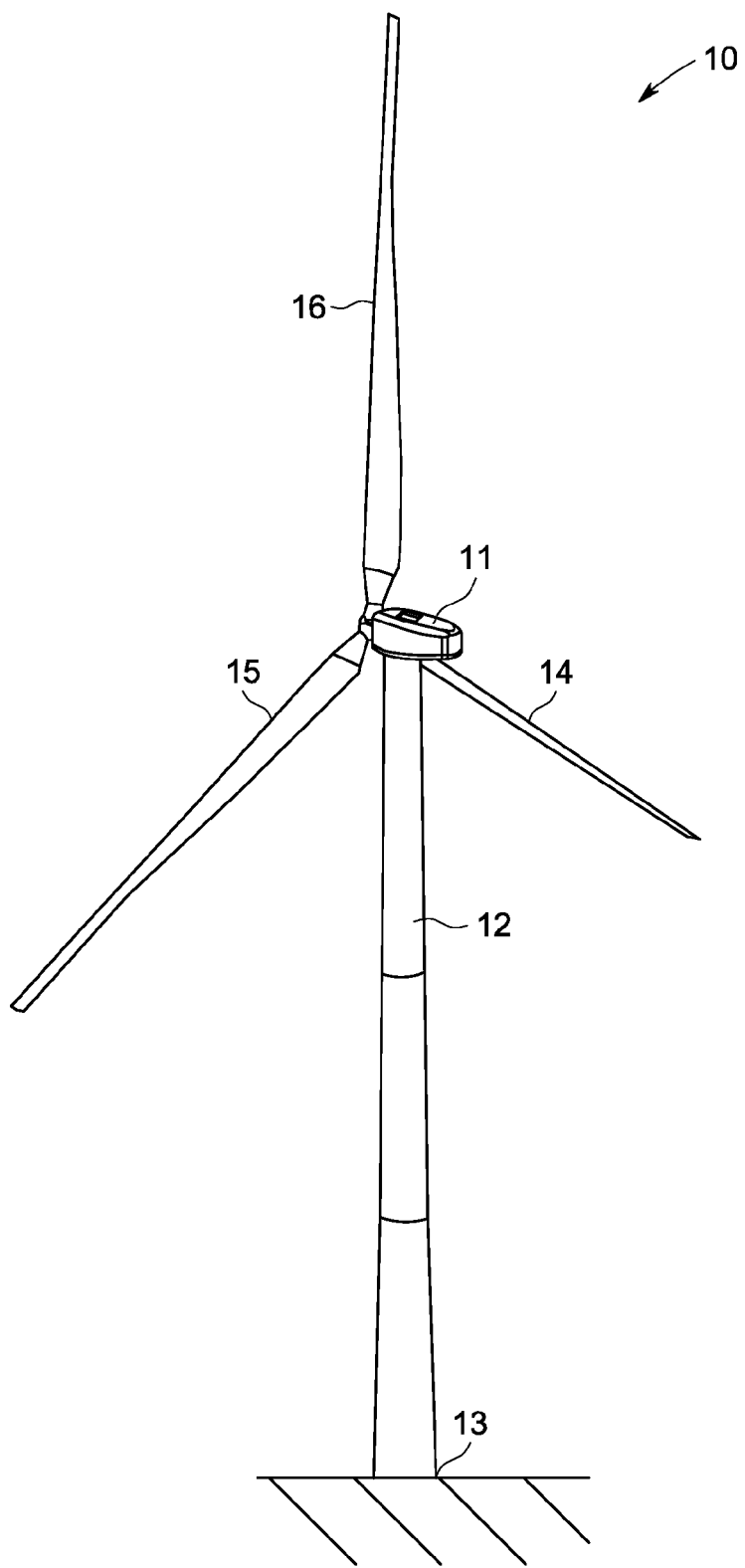
FIG. 1 illustrates a wind turbine system in which embodiments of the invention are integrated therein.
Figure 2:
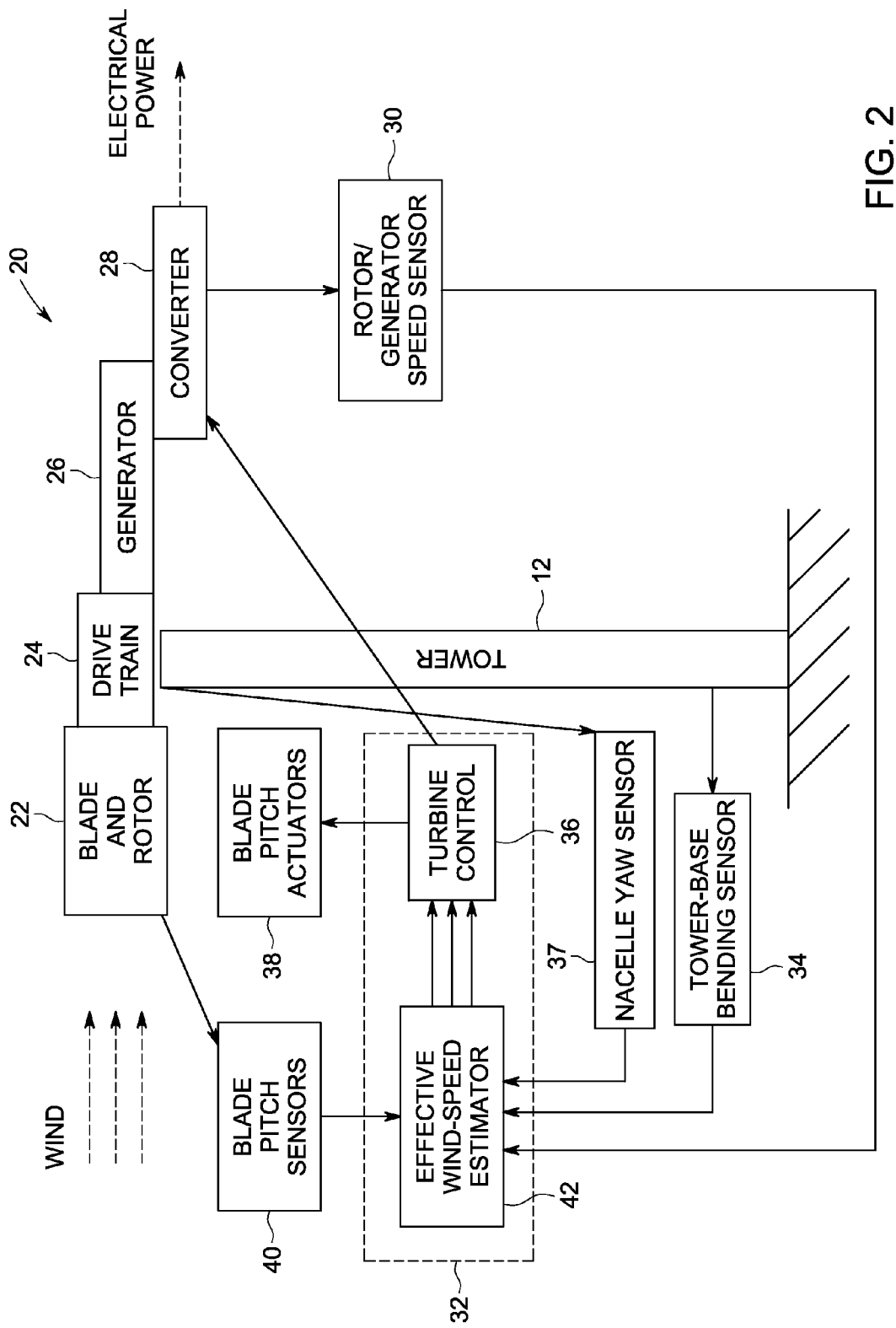
FIG. 2 is a block diagram illustrating a turbine control system according to one embodiment.

In some configurations and referring to FIG. 1, a wind turbine 10 comprises a nacelle 11 housing a generator (e.g. 26 in FIG. 2). Nacelle 11 is mounted atop a tall tower 12. Wind turbine 10 also comprises a rotor (e.g. 22 FIG. 2) that includes one or more rotor blades 14, 15, 16 attached to a rotating hub. Although wind turbine 10 illustrated in FIG. 1 includes three rotor blades 14, 15, 16, there are no specific limits on the number of rotor blades required by the embodiments described herein.

In some configurations and referring to FIGS. 1 and 2, various components are housed in nacelle 11 atop tower 12 of wind turbine 10. The height of tower 12 is selected based upon factors and conditions known in the art. In some configurations, one or more controllers 32 including algorithmic software are used for wind-speed monitoring and turbine control and may be based on distributed or centralized control architectures.

In some configurations, one or more variable blade pitch drive actuators 38 are provided to control the pitch of blades 14, 15, 16. In some configurations, the pitches of blades 14, 15, 16 are individually controlled by the blade pitch actuators 38.

The drive train 24 of the wind turbine includes a main rotor shaft (also referred to as a "low speed shaft") connected to a hub via a main bearing and (in some configurations), at an opposite end of the rotor shaft to a gear box. The gear box, in some configurations, utilizes dual path geometry to drive an enclosed high speed shaft. In other configurations, the main rotor shaft is coupled directly to a generator 26. The high speed shaft is used to drive generator 26.

With continued reference to FIG. 2, a wind turbine control system 20 according to one embodiment includes two or more tower-base bending sensors 34 configured to measure tower-base loads. This architecture provides advantages over known tower position measurement systems that require costly GPS-based measurement devices. The use of tower-base loads, for example, requires less expensive sensors that may include, without limitation, load cells, strain gages, fiber-optic, piezoresistive, and/or capacitive sensors. Further, the use of tower-base loads provides faster estimation of wind speed variations and gusts than that achievable when using GPS techniques.

Optionally combining tower-base load sensing with generator torque sensing advantageously provides a wind-speed estimator with built-in redundancy. This redundancy potentially enables monitoring of wind turbine blade condition.

The embodiments described herein provide a means to achieve faster tracking of optimal tip-speed ratio in the variable-speed region (low wind speeds), thus leading to increased energy capture. The embodiments described herein further provide a means for reducing tower loading in the constant speed region (medium and high wind speeds). According to one embodiment, a method provides for large-area measurement of tower deflection in real-time and continuously uses the measurement data to very quickly estimate the wind speed. This fast estimation of wind speed is transmitted to a controller 32 that operates to reduce tower loading and increase energy capture, as stated above.

According to one embodiment, piezoresistive material is integrated with, bonded to, or otherwise attached to the tower 12 at or near the base 13. The piezoresistive material can, for example, be added to the cement in concrete towers or applied as surface patches (or paint) in concrete or steel towers. Electrical conductivity measurements can then be made to estimate the tower deflection. According to one aspect, deflection measurements are made over a large area of the tower in order to increase the accuracy of the wind speed estimation. This is done, for example, and without limitation, by using permanently installed sensor arrays. These sensor arrays may be implemented using, without limitation, eddy current, AC, and/or DC potential drop sensors. Measurements are then calibrated to correlate the conductivity measurement values to deflection values.

Figure 4:
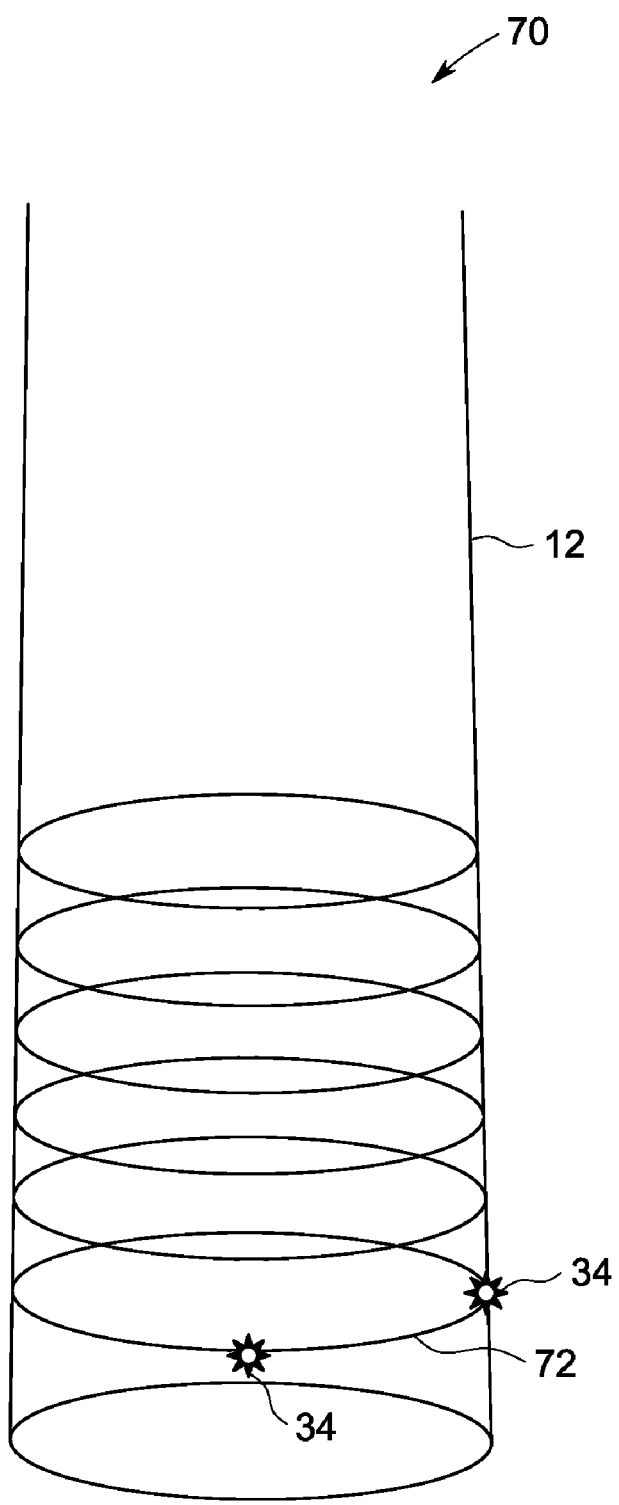
FIG. 4 illustrates a wind turbine tower in which a pair of tower-base bending sensors is installed according to one embodiment.

According to one embodiment, a pair of tower deflection measurement sensors 34 are placed within a range about one meter to about 1.5 meters above of the tower/foundation joint 13 or base of the tower 12 such as depicted in FIG. 4. Other embodiments include two or more sensors placed more than about 1.5 meters above the tower/foundation joint 13 or base of the tower 12. The sensors 34 are radially displaced 72 from one another by about 90° according to one aspect as depicted in FIG. 4. It can be appreciated that the nacelle 11 will be moving as the wind changes direction, but the tower 12 is stationary. Therefore, at least two tower-base bending sensors 34 in conjunction with an accurate measurement of the nacelle 11 yawing direction provided via a nacelle yaw sensor 37 together operate to separate the tower 12 longitudinal bending moment (good for wind speed estimation) from the tower lateral bending moment.

The embodiments described herein advantageously provide an ability to measure wind tower deflection quickly in real-time, and at large numbers of points over a large area of the tower 12. These embodiments further overcome inaccuracy of deflection measurements due imperfect contact between electrodes and the tower 12 such as generally associated with use of strain measurements of piezoresistive cement-based materials using a 4-pole electrode arrangement.

Figure 3:
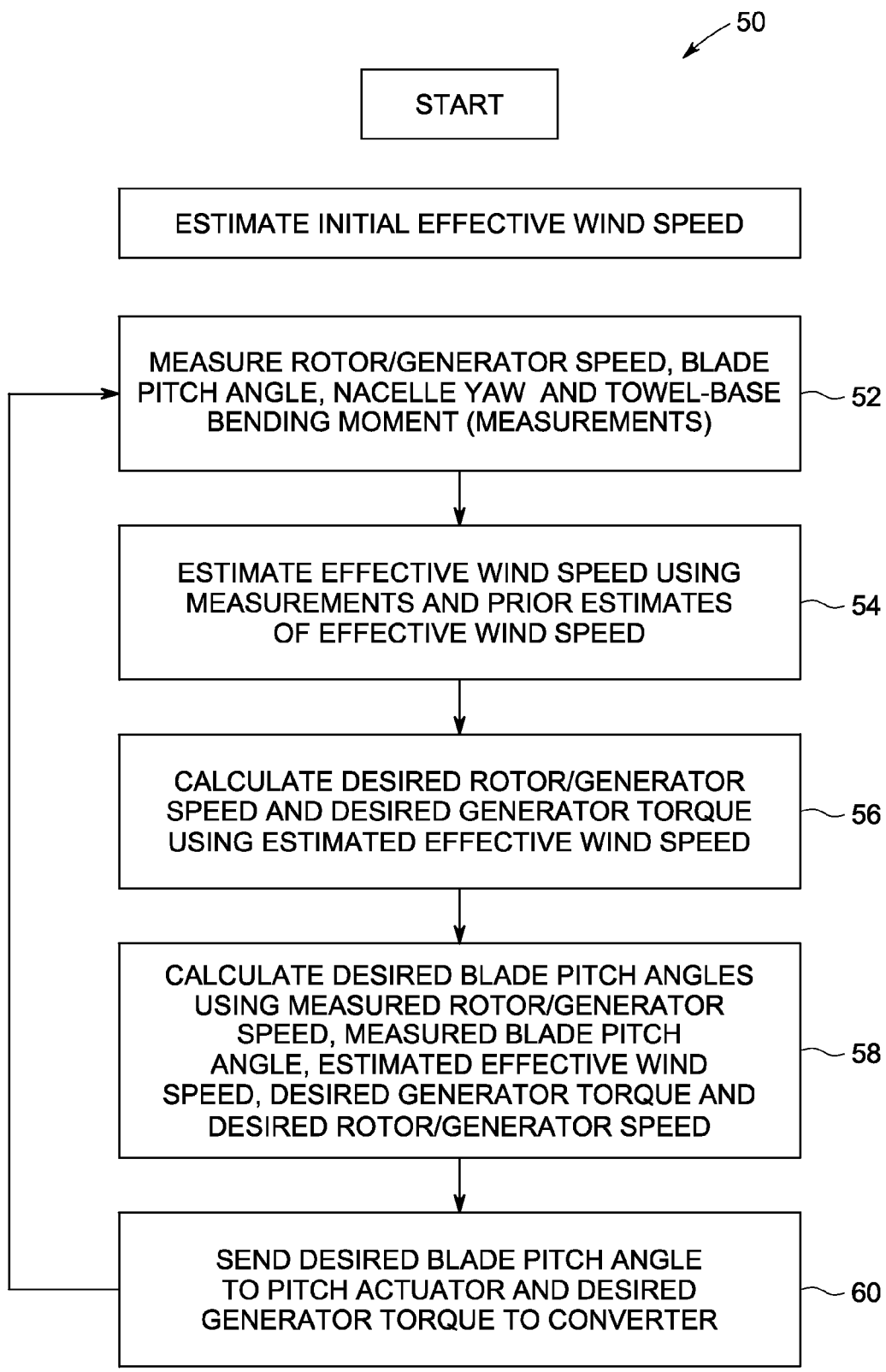
FIG. 3 is flow chart illustrating a method of controlling a wind turbine according to one embodiment.

FIG. 3 is flow chart illustrating a method 50 of controlling a wind turbine 10 according to one embodiment. According to one embodiment, method 50 commences by measuring rotor/generator speed, blade pitch angle and tower-base bending moment as represented in block 52.

The rotor/generator speed measurement data is obtained via one or more rotor/generator speed sensors 30 such as depicted in FIG. 2. According to one aspect, a rotor/generator converter 28, also depicted in FIG. 2, generates the electrical signals transmitted to the rotor/generator speed sensors 30.

The blade pitch angle measurement data is obtained via one or more blade pitch sensors 40 such as depicted in FIG. 2. According to one embodiment, each turbine blade 14, 15, 16 has one or more corresponding pitch sensors 40.

The tower-base longitudinal bending moment measurement data is obtain via two or more tower-base bending sensors 34 such as depicted in FIGS. 2 and 4, that can be piezoresistive material that is integrated with, bonded to, or otherwise attached to the tower 12 at or near the base 13, as stated above. According to one embodiment, the piezoresistive material is added to the cement in concrete towers or applied as surface patches (or paint) in concrete or steel towers. Electrical conductivity measurements can then be made to estimate the tower deflection. According to one aspect, deflection measurements are made over a large area of the tower in order to increase the accuracy of the wind speed estimation by using permanently installed sensor arrays. These sensor arrays may be implemented using, without limitation, eddy current, AC, and/or DC potential drop sensors. Measurements are then calibrated to correlate the conductivity measurement values to deflection values.

It can be appreciated that hybrid towers may require more than one set or pair of bending moment sensors 34. A hybrid tower that includes a steel top section and a bottom concrete section, for example, may employ one set or pair of sensors 34 at the base or bottom portion of the steel top section and a second set or pair of sensors 34 at the base or bottom portion of the concrete section.

A nacelle yaw sensor 37 provides for the measurement of the wind turbine nacelle 11 yaw such that longitudinal moments can be distinguished from lateral bending moments.

Effective wind-speed estimates are then determined using the rotor/generator speed measurement data, the blade pitch angle measurement data, the nacelle 11 measurement data, the tower-base bending moment measurement data, or combinations thereof along with prior estimates of effective wind speed as represented in block 54. The effective wind-speed estimates are determined via an algorithmic effective wind-speed estimator 42 within a controller 32.

A desired rotor/generator speed and a desired generator torque are next determined using the estimated effective wind-speed as represented in block 56. The desired rotor/generator speed and desired generator torque operate to reduce tower loading and increase energy capture, as stated above.

The foregoing measured rotor/generator speed, measured blade pitch angle, estimated effective wind-speed, desired generator torque, and desired rotor/generator speed are then used by the effective wind-speed estimator algorithm 42 to determine one or more desired blade pitch angles, as represented in block 58. Desired blade pitch angle signals are then communicated to the blade pitch actuator(s) 38, and desired generator torque signals are communicated to the generator converter 28 as represented in block 60, via a turbine control unit 36 that forms one portion of wind turbine controller 32 as shown in FIG. 2.

The blade pitch angle(s) and the rotor/generator speed are adjusted in response to the desired blade pitch angle signals and the desired generator torque signals to reduce tower loading and increase wind turbine energy capture.

Providing fast, real-time, large-area measurements of the wind turbine tower deflection allows for accurate and effective measurement of wind speeds at the wind turbine rotor. This information enables faster tracking of optimal tip-speed ratio to increase energy capture in low-wind speed regions where the wind speed variation is great. This information further enables faster tracking of optimal tip-speed ratio to increase energy capture in medium and high wind speed regions to reduce tower loading.

While the invention has been described in terms of various specific embodiments, those skilled in the art will recognize that the invention can be practiced with modification within the spirit and scope of the claims.

What is claimed is:

1. A wind turbine comprising:
   a plurality of wind turbine blades attached to a rotor positioned atop a tower affixed to a tower foundation;
   at least one blade pitch sensor configured to measure blade pitch angles for one or more wind turbine blades;
   a rotor/generator speed sensor configured to measure the rotational speed of the wind turbine rotor, a corresponding wind turbine generator, or both;
   a wind turbine nacelle yaw sensor configured to measure nacelle yaw;
   at least two tower-base bending sensor elements configured without use of adhesives, cements or bonding agents, to measure over a large area, tower deflection in real-time; and
   a controller configured to adjust the pitch angle of one or more wind turbine blades in response to the measured one or more blade pitch angles, the measured rotational speed, the measured nacelle yaw, and measured tower longitudinal deflection.

2. The wind turbine according to claim 1, wherein the controller is further configured to adjust the generator torque in response to the measured rotational speed, the measured nacelle yaw, and the measured tower longitudinal deflection.

3. The wind turbine according to claim 1, wherein the at least two tower-base bending sensor elements comprise a large area array of bending sensors.

4. The wind turbine according to claim 3, wherein the large area array of bending sensors comprise two or more sensors selected from eddy current sensors, alternating current sensors, and direct current potential drop sensors.

5. The wind turbine according to claim 1, wherein at least one tower-base bending sensor element comprises piezoelectric material integrated with the concrete material of a concrete tower.

6. The wind turbine according to claim 1, wherein at least one tower-base bending sensor element comprises piezoelectric material applied as a surface patch or surface coat on a concrete or steel tower.

7. The wind turbine according to claim 1, wherein one or more tower-base bending sensor elements are selected from load cells, strain gages, fiber optic sensors, piezoresistive sensors, and capacitive sensors.

8. The wind turbine according to claim 1, wherein the at least two tower-base bending sensor elements comprise:
   two or more tower-base bending sensor elements disposed at the base portion of a top section of a hybrid tower; and
   two or more tower-base bending sensor elements disposed at the base portion of a bottom section of a hybrid tower.

9. The wind turbine according to claim 1, wherein at least two tower-based bending sensor elements are disposed about 90 angular degrees apart at or near the surface of the tower when referenced to the center of the tower and further between the tower foundation and a location about 1.5 meters above the tower foundation.

10. A wind turbine control system comprising:
    at least one sensor configured to measure blade pitch angles for one or more wind turbine blades;
    a rotor/generator speed sensor configured to measure the rotational speed of a wind turbine rotor; a wind turbine generator, or both;
    a wind turbine nacelle yaw sensor configured to measure nacelle yaw;
    at least two sensor elements configured without use of adhesives, cements or bonding agents, to measure over a large area, tower deflection in real-time; and
    a controller configured to adjust the pitch angle of one or more wind turbine blades in response to the measured one or more blade pitch angles, the measured rotational speed, the measured nacelle yaw, and measured tower longitudinal deflection.

11. The wind turbine control system according to claim 10, wherein the controller is further configured to adjust the generator torque in response to the measured rotational speed, the measured nacelle yaw, and the measured tower longitudinal deflection.

12. The wind turbine control system according to claim 10, wherein the at least two tower-base bending sensor elements comprise a large area array of bending sensors.

13. The wind turbine control system according to claim 10, wherein at least one tower-base bending sensor element comprises piezoelectric material integrated with the concrete material of a concrete tower.

14. The wind turbine control system according to claim 10, wherein at least one tower-base bending sensor element comprises piezoelectric material applied as a surface patch or surface coat on a concrete or steel tower.

15. The wind turbine control system according to claim 10, wherein one or more tower-base bending sensor elements are selected from load cells, strain gages, fiber optic sensors, piezoresistive sensors, and capacitive sensors.

16. The wind turbine according to claim 10, wherein the least two tower-base bending sensor elements comprise:
two or more tower-base bending sensor elements disposed at the base portion of a top section of a hybrid tower; and
two or more tower-base bending sensor elements disposed at the base portion of a bottom section of a hybrid tower.

17. A method of actuating a wind turbine positioned atop a tower affixed to a tower foundation, the method comprising:
providing at least one blade pitch sensor configured to measure blade pitch angles for one or more wind turbine blades;
providing a rotor/generator speed sensor configured to measure the rotational speed of a wind turbine rotor, a wind turbine generator, or both;
providing a wind turbine nacelle yaw sensor configured to measure nacelle yaw;
providing at least two tower-base bending sensor elements configured without use of adhesives, cements or bonding agents, to measure over a large area, tower deflection in real-time;
measuring blade pitch angles for one or more wind turbine blades;
measuring the rotational speed of a wind turbine rotor, a wind turbine generator, or both;
measuring the wind turbine nacelle yaw;
measuring tower deflection in real-time for a large surface area of the tower; and
adjusting the pitch angle of one or more wind turbine blades in response to the measured one or more blade pitch angles, the measured rotation speed, the measured nacelle yaw and measured tower longitudinal deflection.

18. The method of actuating a wind turbine according to claim 17, further comprising adjusting the generator torque in response to the measured rotational speed, the measured nacelle yaw, and the measured tower longitudinal deflection.

19. The method of actuating a wind turbine according to claim 17, wherein providing at least two tower-base bending sensor elements configured without use of adhesives, cements or bonding elements, to measure over a large area, tower deflection in real-time comprises providing at least one large area array of bending sensors.

20. The method of actuating a wind turbine according to claim 17, wherein providing at least two tower-base bending sensor elements comprises providing piezoelectric material integrated with the concrete material of a concrete tower.

* * * * *

UNITED STATES PATENT AND TRADEMARK OFFICE
CERTIFICATE OF CORRECTION

PATENT NO.         : 7,755,210 B2                                    Page 1 of 1
APPLICATION NO.    : 12/631003
DATED              : July 13, 2010
INVENTOR(S)        : Kammer et al.

It is certified that error appears in the above-identified patent and that said Letters Patent is hereby corrected as shown below:

Title Page, Item (56), under "OTHER PUBLICATIONS", delete "thhp:" and insert -- http: --, therefor.

Title Page, Item (56), under "OTHER PUBLICATIONS" delete "uk/clocuments/" and insert -- uk/documents/ --, therefor.

In Column 6, Line 54, in Claim 10, delete "rotor;" and insert -- rotor, --, therefor.

Signed and Sealed this
Fifth Day of July, 2011

David J. Kappos
*Director of the United States Patent and Trademark Office*